United States Patent
Maeda et al.

(10) Patent No.: US 9,673,867 B2
(45) Date of Patent: Jun. 6, 2017

(54) POWER TRANSMISSION DEVICE AND POWER FEEDING SYSTEM

(71) Applicant: SEMICONDUCTOR ENERGY LABORATORY CO., LTD., Atsugi-shi, Kanagawa-ken (JP)

(72) Inventors: Shuhei Maeda, Kanagawa (JP); Koichiro Kamata, Kanagawa (JP); Misako Miwa, Miyagi (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 358 days.

(21) Appl. No.: 13/789,864

(22) Filed: Mar. 8, 2013

(65) Prior Publication Data

US 2013/0241301 A1 Sep. 19, 2013

(30) Foreign Application Priority Data

Mar. 14, 2012 (JP) .................. 2012-057763

(51) Int. Cl.
*H02J 50/00* (2016.01)
*H02J 50/10* (2016.01)
(Continued)

(52) U.S. Cl.
CPC ......... *H04B 5/0037* (2013.01); *H04B 5/0093* (2013.01)

(58) Field of Classification Search
CPC ..... H04B 5/0093; H04B 5/0037; H02J 5/005; H02J 7/025; H02J 17/00; B60L 11/182;
(Continued)

(56) References Cited

U.S. PATENT DOCUMENTS 2,297,668 A * 9/1942 Batchelder ................ G01S 1/72
367/122
5,187,390 A * 2/1993 Scott, III ............. G11C 27/024
327/362
(Continued)

FOREIGN PATENT DOCUMENTS

JP 08-148960 A 6/1996
JP 2006-203466 A 8/2006
(Continued)

*Primary Examiner* — Fritz M Fleming
*Assistant Examiner* — Thai Tran
(74) *Attorney, Agent, or Firm* — Nixon Peabody LLP; Jeffrey L Costellia

(57) ABSTRACT

There is provided a power transmission device which includes an antenna receiving a reflected power from a power receiving device, a power detection unit detecting a value of the reflected power received by the antenna, a control circuit determining a power adjustment value in accordance with the value of the reflected power, a power adjustment unit to which the reflected power whose value is detected is input and which adjusts impedance in accordance with the power adjustment value determined by the control circuit, and a demodulation circuit to which the reflected power having the power adjustment value determined by the control circuit is input via the power adjustment unit having the adjusted impedance, and relates to a power feeding system including the power transmission device.

14 Claims, 9 Drawing Sheets

(51) Int. Cl.
*H02J 50/12* (2016.01)
*H02J 50/80* (2016.01)
*H04B 5/00* (2006.01)

(58) Field of Classification Search
CPC  B60L 11/1829–11/1831; Y02T 90/122; A61B 1/00029
USPC .......................................... 307/104; 320/108
See application file for complete search history.

(56) References Cited

U.S. PATENT DOCUMENTS

| | | | | |
|---|---|---|---|---|
| 6,466,628 | B1* | 10/2002 | Kim | H03C 3/406 330/284 |
| 2003/0201854 | A1* | 10/2003 | Dove | H01P 1/22 335/47 |
| 2006/0269186 | A1* | 11/2006 | Frame | H03H 7/24 385/12 |
| 2006/0279380 | A1* | 12/2006 | Chung et al. | 333/170 |
| 2010/0285836 | A1* | 11/2010 | Horihata | H01Q 1/243 455/552.1 |
| 2011/0018358 | A1 | 1/2011 | Kozakai | |
| 2011/0193417 | A1 | 8/2011 | Hirasaka et al. | |
| 2011/0266880 | A1* | 11/2011 | Kim | H02J 7/025 307/104 |
| 2011/0309689 | A1 | 12/2011 | Kamata | |
| 2012/0038317 | A1 | 2/2012 | Miyamoto et al. | |
| 2012/0161536 | A1 | 6/2012 | Kamata et al. | |
| 2012/0187771 | A1 | 7/2012 | Kamata et al. | |
| 2013/0026849 | A1 | 1/2013 | Ohta et al. | |
| 2013/0069585 | A1 | 3/2013 | Kamata | |
| 2013/0082648 | A1 | 4/2013 | Kamata | |
| 2013/0119776 | A1 | 5/2013 | Kamata | |
| 2013/0147281 | A1 | 6/2013 | Kamata | |
| 2013/0154385 | A1 | 6/2013 | Miwa et al. | |
| 2013/0154556 | A1 | 6/2013 | Takahashi et al. | |
| 2013/0162203 | A1 | 6/2013 | Kamata | |

FOREIGN PATENT DOCUMENTS

| | | |
|---|---|---|
| JP | 2010-284066 | 12/2010 |
| JP | 2011-029799 | 2/2011 |
| JP | 2011-166883 | 8/2011 |
| JP | 2011-223716 | 11/2011 |
| JP | 2012-044735 A | 3/2012 |
| JP | 2012-044752 A | 3/2012 |
| WO | WO-2011/121877 | 10/2011 |

* cited by examiner

POWER TRANSMISSION DEVICE AND POWER FEEDING SYSTEM

BACKGROUND OF THE INVENTION

1. Field of the Invention

One embodiment of the invention disclosed herein relates to a power transmission device and a power feeding system.

2. Description of the Related Art

Various electronic appliances have spread, and a variety of products is shipped to the market. In recent years, portable electronic devices such as cellular phones and digital video cameras have widely spread. Further, electric propulsion moving vehicles that are powered by electric power, such as electric cars, appear on the market as products.

In such mobile phones, digital video cameras or electric propulsion vehicles, power storage devices serving as power storage means (referred to as batteries and storage batteries) are incorporated. Currently, power feeding to such a power storage device is performed in most cases by direct connection to a household AC power source which is a power feeding means. In addition, a structure without a power storage device or a structure which does not use electric power fed to a power storage device is directly fed with power from a household AC power source through a wiring or the like so that a unit operates.

On the other hand, methods by which electric power is fed to power storage devices without making contact or electric power is fed to loads without making contact have been researched and developed. Typical methods are an electromagnetic coupling method (also referred to as electromagnetic induction method, see Patent Document 1), a radio wave method (also referred to as microwave method), and a magnetic resonant method (also referred to as resonant method, see Patent Documents 2 and 3).

As described in Patent Document 2, in a contactless power feeding technique using a magnetic resonant method, a device that receives electric power (hereinafter, referred to as power receiving device) and a device that supplies power (hereinafter, referred to as power transmission device) each have a resonant coil. Further, in each of the power receiving device and the power transmission device, an electromagnetic induction coil is provided. Feeding of power from a power source to the resonant coil in the power transmission device and feeding of power from the resonant coil to a load in the power receiving device are conducted by the electromagnetic induction coils.

In the resonant coil of the power transmission device and the resonant coil of the power receiving device, resonance frequencies (LC resonance) are adjusted so that a magnetic resonance phenomenon occurs at a particular frequency.

When the resonant coil of the power transmission device and the resonant coil of the power receiving device face each other, they makes a magnetic resonance phenomenon, and thereby efficient power transfer is realized even when the distance between the resonant coils is large (see Non-Patent Document 1).

The above contactless power feeding technique is favorable because wireless communication between the power transmission device and the power receiving device and safety management such as individual identification and detection of foreign substances can be performed at the same time as contactless power feeding. In addition, the above contactless power feeding is favorable because during contactless power feeding, communication of information about power and charge of the power receiving device can be performed and the power transmission device can perform control of power feeding, such as adjustment of power.

To perform wireless communication between the power transmission device and the power receiving device at the same time as contactless power feeding, both an antenna for communication and an antenna for power feeding are prepared. However, as disclosed in Patent Document 4, when one antenna can be used for both communication and power feeding, it is possible to reduce the size, weight, and cost of a power feeding system including the power transmission device and the power receiving device.

REFERENCE

Patent Document

[Patent Document 1] Japanese Published Patent Application No. 2011-223716
[Patent Document 2] Japanese Published Patent Application No. 2011-29799
[Patent Document 3] Japanese Published Patent Application No. 2011-166883
[Patent Document 4] Japanese Published Patent Application No. 2010-284066

Non-Patent Document

[Non-Patent Document 1] "Wireless power feeding 2010, all about contactless charging and wireless energy transfer" *Nikkei Electronics*, March 2010, pp. 66-81

SUMMARY OF THE INVENTION

In the case where one antenna is used for both communication and power feeding as described above, that is, communication and power feeding are performed with an antenna of the power transmission device and an antenna of the power receiving device, there is a possibility that the value of a power used for the communication is largely different from the value of a power used for the power feeding.

Specifically, first, communication for identification, detection of foreign substances, and the like is performed between the power transmission device and the power receiving device with a power which has a value far smaller than the value of the power used for power feeding. In the case where it is determined from the communication that the power transmission device and the power receiving device can be charged, power feeding is started using a power which has a value far larger than the value of the power used for the communication.

When power feeding is advanced, the state of the power receiving device (e.g., a resistance value of a secondary battery included in the power receiving device) is changed. As the state of the power receiving device is changed, the level of a reflected power from the power receiving device to the power transmission device is changed. The communication between the power transmission device and the power receiving device is carried out using the reflected power. Therefore, a change in the level of the reflected power might adversely influence the communication between the power transmission device and the power receiving device. For example, when power feeding is advanced and the level of the reflected power is changed, the communication between the power transmission device and the power receiving device might not be established.

As for an input power to a demodulation circuit of the power transmission device, an input voltage region where stable communication processing is possible exists. When the voltage value of the input power is out of the input voltage region, it is necessary to adjust the voltage value of the input power to the demodulation circuit in order to normally perform the communication between the power transmission device and the power receiving device from the start of power feeding until the termination of the power feeding.

In view of the foregoing, an object of one embodiment of the disclosed invention is to provide a power transmission device which is capable of stable communication at the same time as power feeding.

An object of another embodiment of the disclosed invention is to provide a power feeding system including the power transmission device which is capable of stable communication at the same time as power feeding.

In one embodiment of the disclosed invention, a reflected power detection unit is provided in a power transmission device, and on the basis of the detected value of a reflected power, a control circuit calculates an optimal power adjustment value for the value of the reflected power so that the reflected power has a value within the input voltage region where a demodulation circuit can stably perform communication processing, and determines the power adjustment value.

Impedance of a power adjustment unit is adjusted so that the power adjustment value which is determined in the control circuit is obtained, whereby the value of a power which is input to the demodulation circuit via the power adjustment unit is within the input voltage region where the demodulation circuit can stably perform communication processing.

Thus, it is possible to provide a power transmission device which is capable of stable communication at the same time as power feeding.

In addition, with the power transmission device, it is possible to provide a power feeding system which is capable of stable communication at the same time as power feeding.

One embodiment of the disclosed invention relates to a power transmission device including an antenna receiving a reflected power from a power receiving device, a power detection unit detecting a value of the reflected power received by the antenna, a control circuit determining a power adjustment value in accordance with the value of the reflected power, a power adjustment unit to which the reflected power whose value is detected is input and which adjusts impedance in accordance with the power adjustment value determined by the control circuit, and a demodulation circuit to which the reflected power having the power adjustment value determined by the control circuit is input via the power adjustment unit having the adjusted impedance.

In one embodiment of the disclosed invention, the power adjustment unit includes a plurality of power adjustment elements between the power detection unit and the demodulation circuit.

One embodiment of the disclosed invention relates to a power feeding system including a power transmission device and a power receiving device. The power transmission device includes a first antenna sending an AC power and receiving a reflected power from the power receiving device, a first power detection unit detecting a value of the reflected power received by the first antenna, a first control circuit determining a power adjustment value in accordance with the value of the reflected power, a power adjustment unit adjusting impedance in accordance with the power adjustment value determined by the first control circuit, and a first demodulation circuit to which the reflected power having the power adjustment value determined by the first control circuit is input via the power adjustment unit having the adjusted impedance. The power receiving device includes a second antenna, a rectifier circuit rectifying an AC power received by the second antenna and converting the AC power to a DC power, a second power detection unit detecting a value of the DC power rectified by the rectifier circuit, a voltage adjustment unit converting the value of the DC power to a different value, a power storage device storing the DC power having the different value, a third power detection unit detecting the value of the DC power stored in the power storage device, a second control circuit controlling the second power detection unit and the third power detection unit, and a second demodulation circuit converting the AC power received by the second antenna into a signal which can be processed by the control circuit.

In one embodiment of the disclosed invention, the power adjustment unit includes a plurality of power adjustment elements between the first power detection unit and the first demodulation circuit.

In one embodiment of the disclosed invention, one of the plurality of power adjustment elements is an attenuator including a plurality of resistors.

In one embodiment of the disclosed invention, another one of the plurality of power adjustment elements is a rectifier circuit including a plurality of capacitors.

According to one embodiment of the disclosed invention, it is possible to provide a power transmission device which is capable of stable communication at the same time as power feeding.

Further, according to one embodiment of the disclosed invention, it is possible to provide a power feeding system which includes the power transmission device which is capable of stable communication at the same time as power feeding.

DETAILED DESCRIPTION OF THE INVENTION

Figure 1:
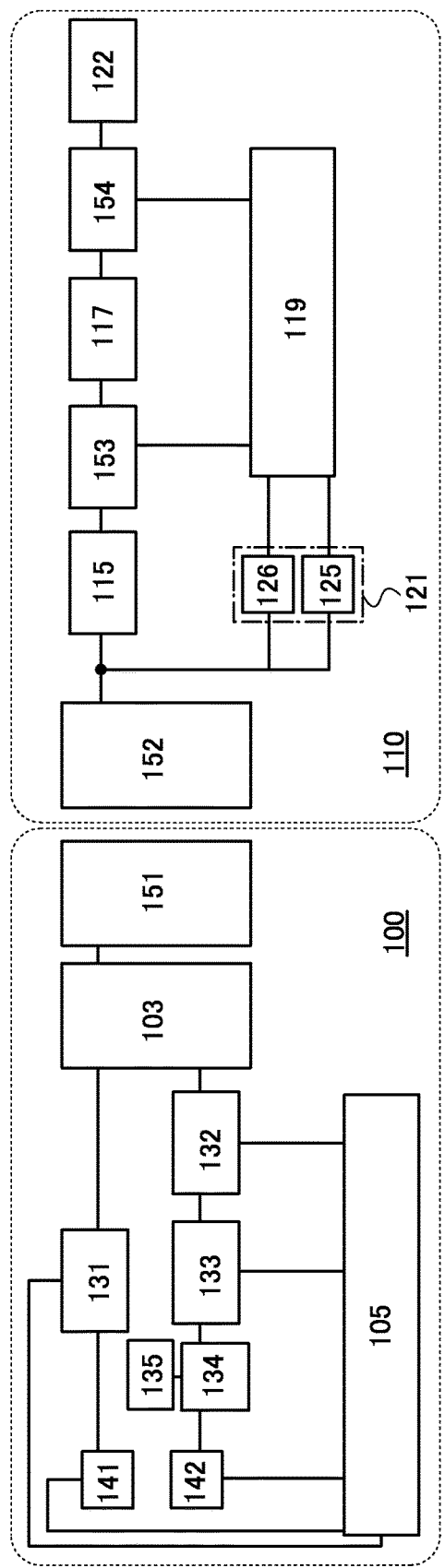
FIG. 1 is a circuit diagram of a power feeding system.

Embodiments of the invention disclosed in this specification will be hereinafter described with reference to the accompanying drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the present invention is not construed as being limited to description of the embodiments. Note that, in the drawings hereinafter shown, the same portions or portions having similar functions are denoted by the same reference numerals, and repeated description thereof will be omitted. Further, in some cases, the same hatching patterns are applied to similar parts, and the similar parts are not necessarily designated by reference numerals.

Note that the position, size, range, or the like of each structure shown in the drawings and the like is not accurately represented in some cases for easy understanding. Therefore, the disclosed invention is not necessarily limited to the position, size, range, or the like as disclosed in the drawings and the like.

In this specification and the like, ordinal numbers such as "first", "second", and "third" are used in order to avoid confusion among components, and the terms do not mean limitation of the number of components.

(Embodiment 1)

<Structure of Power Feeding System<

FIG. 1 is a block diagram of a power feeding system having a wireless communication function according to this embodiment. The power feeding system illustrated in FIG. 1 includes a power transmission device 100 and a power receiving device 110.

In the power feeding system illustrated in FIG. 1, an electromagnetic wave generated in the power transmission device 100 is amplitude-modulated and wireless communication is performed between the power transmission device 100 and the power receiving device 110 with the use of the amplitude-modulated electromagnetic wave (modulation signal). Note that a modulation signal which is transmitted from the power transmission device 100 to the power receiving device 110 is a transmission signal. A modulation signal which is included in an electric wave reflected by the power receiving device 110 to the power transmission device 100 is a response signal. The transmission signal transmitted from the power transmission device 100 to the power receiving device 110 has information of the power transmission device 100. The response signal included in the electric wave reflected by the power receiving device 110 to the power transmission device 100 has information of the power receiving device 110.

The power transmission device 100 illustrated in FIG. 1 includes an antenna 151, a directional coupler 103, a power amplifier unit 131, a power detection unit 132, a power adjustment unit 133, a switch 134, a load 135, a control circuit 105, a modulation circuit 141, and a demodulation circuit 142.

The power receiving device 110 illustrated in FIG. 1 includes an antenna 152, a rectifier circuit 115, a power detection unit 153, a voltage adjustment unit 117, a power detection unit 154, a power storage device 122, a communication control unit 121, and a control circuit 119. The communication control unit 121 includes a modulation circuit 125 and a demodulation circuit 126.

<Specific Structure of Power Transmission Device>

Figure 2:
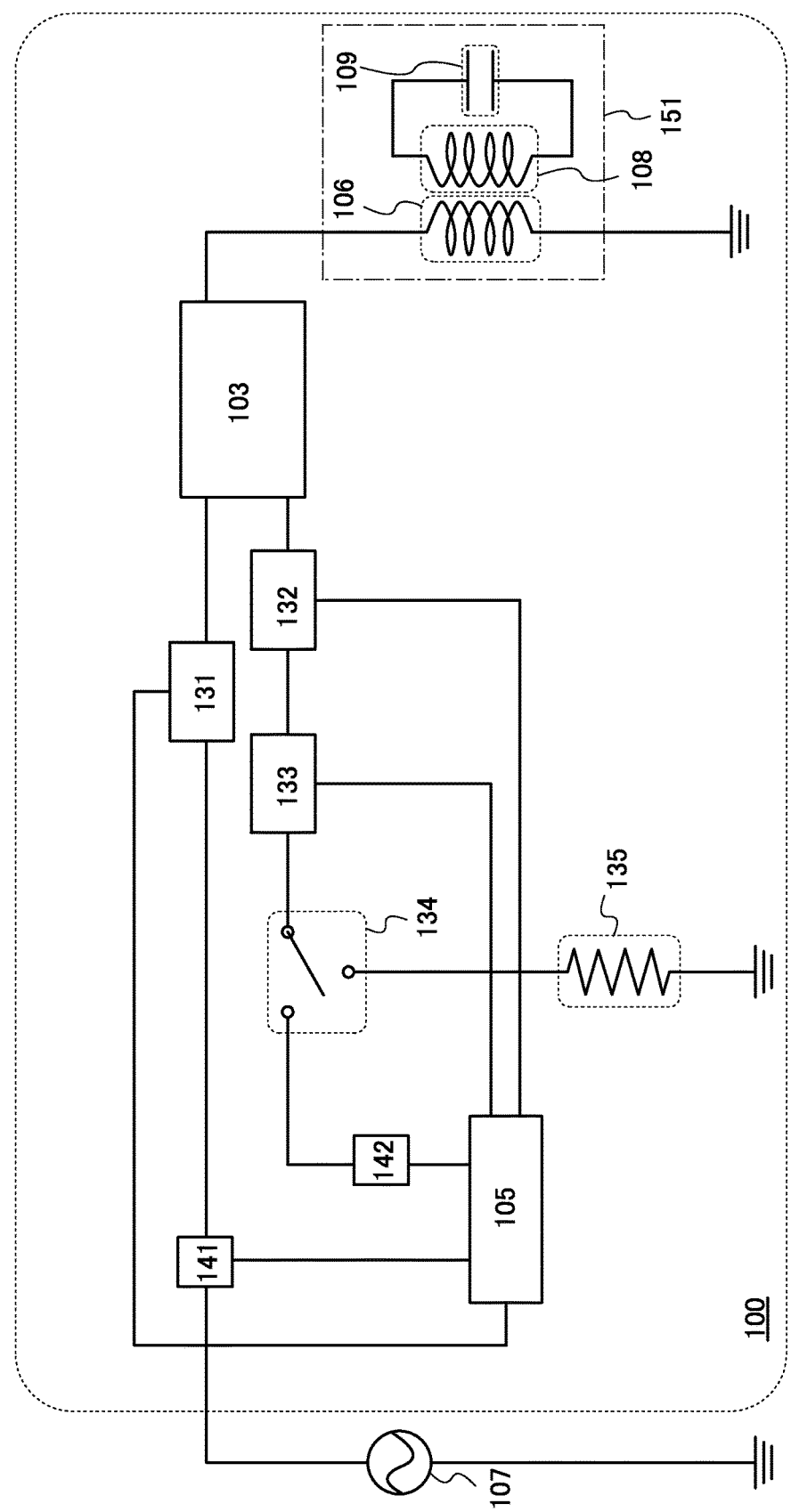
FIG. 2 is a circuit diagram of a power transmission device.

FIG. 2 illustrates a specific structure of the power transmission device 100. The power transmission device 100 illustrated in FIG. 2 includes the modulation circuit 141, the demodulation circuit 142, the control circuit 105, the switch 134, the load 135, the power adjustment unit 133, the power detection unit 132, the power amplifier unit 131, the directional coupler 103, and the antenna 151. In this embodiment, the antenna 151 includes an electromagnetic coupling coil 106, a resonant coil 108, and a capacitor 109. Note that although an AC power source 107 is provided outside the power transmission device 100 in this embodiment, the AC power source 107 may be provided in the power transmission device 100, if necessary.

Note that the AC power source 107, the power amplifier unit 131, the directional coupler 103, and the antenna 151 are used for power feeding between the power transmission device 100 and the power receiving device 110. The AC power source 107, the switch 134, the power adjustment unit 133, the power detection unit 132, the modulation circuit 141, the demodulation circuit 142, the directional coupler 103, and the antenna 151 are used for communication between the power transmission device 100 and the power receiving device 110. Note that the power amplifier unit 131 may be used for the communication between the power transmission device 100 and the power receiving device 110, if necessary.

The AC power source 107 is a power source that generates a high frequency AC power. The AC power functions as a carrier wave in communication and serves as a base of a DC current power which is fed in power feeding. A first terminal of the AC power source 107 is electrically connected to a first terminal of the modulation circuit 141. A second terminal of the AC power source 107 is grounded.

The modulation circuit 141 has a function of converting a transmission signal which is output from the control circuit 105 into a signal with which wireless communication is possible. The transmission signal is generated by the control circuit 105 described later and has the information of the power transmission device 100 as described above. In this embodiment, the transmission signal and the response signal from the power receiving device 110 are electromagnetic waves which are amplitude-modulated as described above. The first terminal of the modulation circuit 141 is electrically connected to the first terminal of the AC power source 107. A second terminal of the modulation circuit 141 is electrically connected to a first terminal of the power amplifier unit 131. A third terminal of the modulation circuit 141 is electrically connected to a first terminal of the control circuit 105.

The power amplifier unit 131 is a circuit which has a function of amplifying the value of an AC power. The value of an AC power at the time when power feeding between the power transmission device 100 and the power receiving device 110 or communication during the power feeding is performed is larger than that of an AC power at the time when only communication is performed. Therefore, for example, in the case where only communication is performed, communication may be performed at the value of a power which is generated in the AC power source 107 without amplification of the AC power; in case where the power feeding or the communication during the power feeding is performed, the AC power which is generated in the AC power source 107 may be amplified by the power amplifier unit 131 and the amplified AC power may be transmitted from the power transmission device 100 to the power receiving device 110. The AC power may be amplified by the power amplifier unit 131 if necessary, even when only communication is performed. The first terminal of the power amplifier unit 131 is electrically connected to the second terminal of the modulation circuit 141. A second terminal of the power amplifier unit 131 is electrically connected to a first terminal of the directional coupler 103. A third terminal of the power amplifier unit 131 is electrically connected to a second terminal of the control circuit 105.

The demodulation circuit 142 has a function of converting the modulation signal (refereed to as the response signal in this specification as described above) from the power receiving device 110 into a signal which can be processed by the control circuit 105. The response signal is included in a reflected power from the power receiving device 110 and has the information of the power receiving device 110. A first terminal of the demodulation circuit 142 is electrically connected to a third terminal of the control circuit 105. A second terminal of the demodulation circuit 142 is electrically connected to a first terminal of the switch 134.

Figure 8:
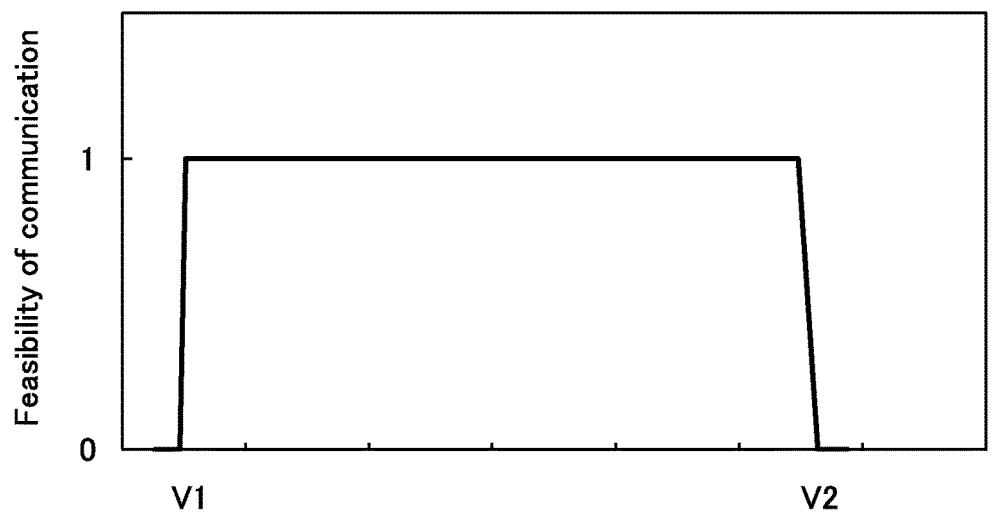
FIG. 8 shows a relation between an input voltage to a demodulation circuit and whether or not communication is performed.

As described above, the demodulation circuit 142 has an input voltage region where the demodulation circuit 142 can stably perform communication processing. FIG. 8 shows a relation between an input voltage to the demodulation circuit 142 and whether or not communication is performed in the power feeding system. In FIG. 8, a value of 1 in the vertical axis indicates that communication can be performed in the power feeding system of this embodiment, and a value of 0 in the vertical axis indicates that communication cannot be performed in the power feeding system of this embodiment. As shown in FIG. 8, the communication can be performed in the power feeding system when the input voltage to the demodulation circuit 142 is higher than or equal to a voltage V1 and lower than or equal to a voltage V2. On the other hand, communication cannot be performed in the power feeding system when the input voltage to the demodulation circuit 142 is lower than the voltage V1 and higher than the voltage V2.

The directional coupler 103 (also referred to as a coupler) can take out signals corresponding to a power transferred in a forward direction (traveling wave), a power transferred in the reverse direction (reflected wave), or the both thereof. The first terminal of the directional coupler 103 is electrically connected to the second terminal of the power amplifier unit 131. A second terminal of the directional coupler 103 is electrically connected to a first terminal of the power detection unit 132. A third terminal of the directional coupler 103 is electrically connected to a first terminal of the electromagnetic coupling coil 106 of the antenna 151.

The power detection unit 132 has a function of detecting the value of the reflected power from the power receiving device 110. Specifically, the power detection unit 132 has a function of detecting the value of a voltage which is applied to the power detection unit 132 and a function of detecting the value of a current which flows in the power detection unit 132. From the detected voltage value and the detected current value, the power detection unit 132 detects the value of the reflected power from the power receiving device 110. The first terminal of the power detection unit 132 is electrically connected to the second terminal of the directional coupler 103. A second terminal of the power detection unit 132 is electrically connected to a first terminal of the power adjustment unit 133. A third terminal of the power detection unit 132 is electrically connected to a fourth terminal of the control circuit 105.

The power adjustment unit 133 has a function of adjusting the reflected power from the power receiving device 110. With the function, it is possible to lower, for example, the reflected power to the input voltage region where the demodulation circuit 142 can stably perform communication processing. The power adjustment unit 133 includes an element which adjusts a power, such as a resistor or a capacitor. The first terminal of the power adjustment unit 133 is electrically connected to the second terminal of the power detection unit 132. A second terminal of the power adjustment unit 133 is electrically connected to a second terminal of the switch 134. A third terminal of the power adjustment unit 133 is electrically connected to a fifth terminal of the control circuit 105.

The power adjustment unit 133 includes a plurality of elements which adjust the reflected power (hereinafter referred to as power adjustment elements). Although the details are described later, in accordance with the value of the reflected power which is detected by the power detection unit 132, the control circuit 105 determines an optimal power adjustment value with respect to the value of the reflected power so that the reflected voltage has a value within the input voltage region where the demodulation circuit 142 can stably perform communication processing. Based on the optimal power adjustment value determined by the control circuit 105, impedance of the power adjustment unit 133 is adjusted so that the reflected power which is input to the demodulation circuit 142 has a value within the input voltage region where the demodulation circuit 142 can stably perform communication processing.

The reflected power whose value is detected by the power detection unit 132 passes through the power adjustment unit 133 in which the impedance is adjusted, whereby the value of the reflected power input to the demodulation circuit 142 becomes within the input voltage region where the demodulation circuit 142 can stably perform communication processing.

Figure 6A:
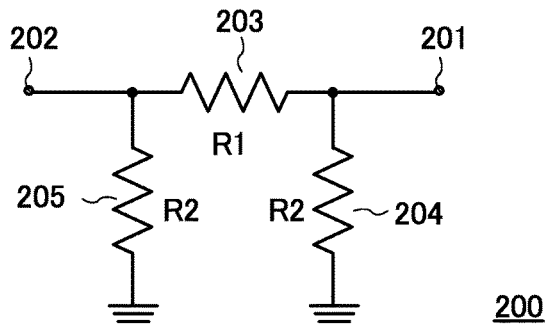
FIGS. 6A to 6C illustrate structures of power adjustment elements and a structure of a power control unit.
Figure 6B:
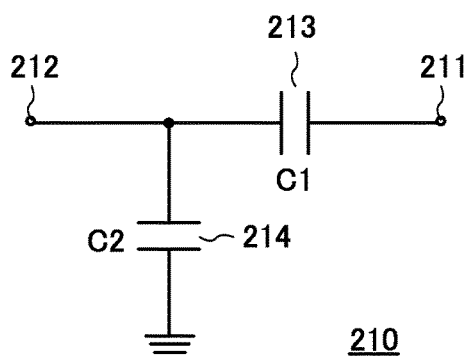
Figure 6C:
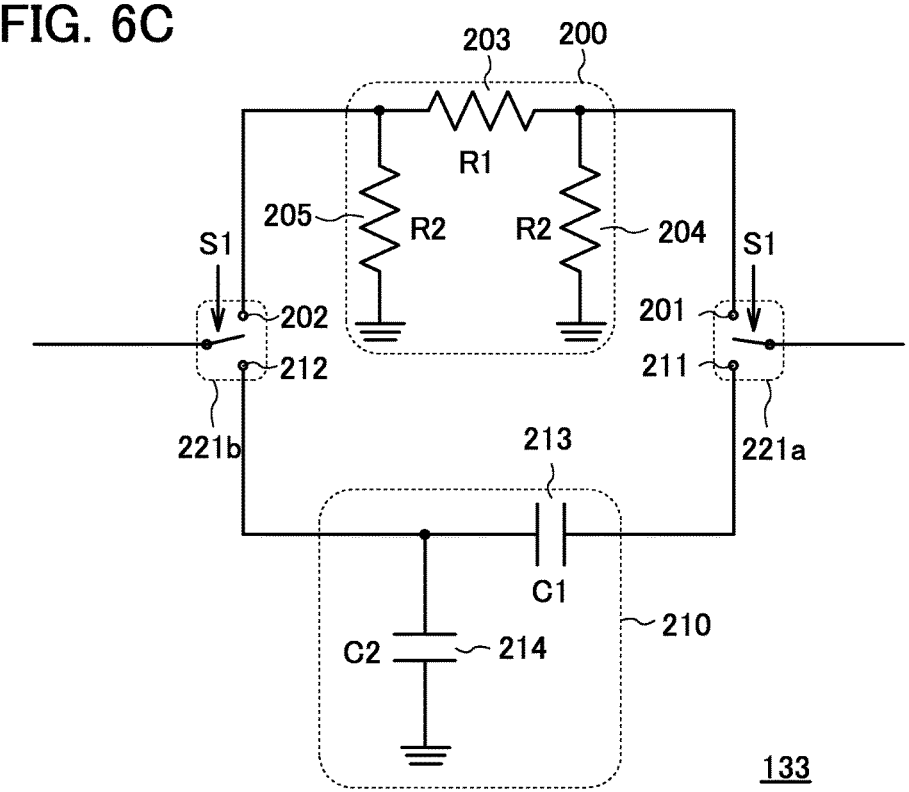

Specific examples of the power adjustment elements are described using FIGS. 6A to 6C.

A power adjustment element 200 illustrated in FIG. 6A is a π-type unbalanced attenuator (also referred to as attenuator) which includes a resistor 203 which has a resistance value R1 and resistors 204 and 205 which have a resistance value R2. One terminal of the resistor 203 is electrically connected to a terminal 201 and one terminal of the resistor 204. The other terminal of the resistor 203 is electrically connected to a terminal 202 and one terminal of the resistor 205. The other terminal of the resistor 204 is grounded. The other terminal of the resistor 205 is grounded.

A power adjustment element 210 illustrated in FIG. 6B is a matching circuit which includes a capacitor 213 having a capacitance value C1 and a capacitor 214 having a capacitance value C2. One terminal of the capacitor 213 is electrically connected to a terminal 211. The other terminal of the capacitor 213 is electrically connected to a terminal 212 and one terminal of the capacitor 214. The other terminal of the capacitor 214 is grounded.

The power adjustment unit 133 includes the plurality of power adjustment elements. An optimal power adjustment element is selected on the basis of the optimal power adjustment value determined by the control circuit 105. For example, as illustrated in FIG. 6C, the power adjustment unit 133 includes the power adjustment element 200 illustrated in FIG. 6A, the power adjustment element 210 illustrated in FIG. 6B, and switches 221a and 221b which operate on the basis of a signal S1 which is output from the control circuit 105.

The switches 221a and 221b select an optimal power adjustment element on the basis of the signal S1 output from the control circuit 105 so that an optimal power adjustment value is obtained. Note that although one of the power adjustment element 200 and the power adjustment element 210 is selected on the bases of the signal S1 in FIG. 6C, the structure of the power adjustment unit 133 is not limited thereto. The power adjustment unit 133 can include a plurality of power adjustment elements and the plurality of power adjustment elements are connected in parallel, in series or in combination thereof. A plurality of switches which operate on the basis of the signal S1 output from the control circuit 105 is provided, and by switching the plurality of switches, optimal power adjustment elements are selected so that an optimal power adjustment value is obtained.

Note that although the attenuator and the matching circuit are described as the power adjustment elements in this embodiment, the power adjustment elements are not limited thereto. As the power adjustment elements, a coil and the like may be used, for example. Although the π-type unbalanced attenuator is described as the attenuator, the attenuator is not limited thereto; another attenuator such as a π-type balanced attenuator, a T-type unbalanced attenuator, or a T-type balanced attenuator may be used.

The switch 134 has a function of supplying the reflected power from the power receiving device 110 to one of the demodulation circuit 142 and the load 135. Although details are described later, when the reflected power has a value within the input voltage region where the demodulation circuit 142 can stably perform communication processing, the power adjustment unit 133 and the demodulation circuit 142 are electrically connected to each other through the switch 134. When the reflected power has a value out of the input voltage region where the demodulation circuit 142 can stably perform communication processing or when it is unclear if the reflected power has a value within the input voltage region where the demodulation circuit 142 can stably perform communication processing, the power adjustment unit 133 and the load 135 are electrically connected to each other through the switch 134. The first terminal of the switch 134 is electrically connected to the demodulation circuit 142. The second terminal of the switch 134 is electrically connected to the second terminal of the power adjustment unit 133. A third terminal of the switch 134 is electrically connected to a first terminal of the load 135.

The control circuit 105 has a function of generating the transmission signal to be transmitted to the power receiving device 110 and a function of processing the response signal which is sent from the power receiving device 110 in response to the transmission signal and which has the information of the power receiving device 110. In addition, the control circuit 105 has a function of controlling the degree of power amplification of the power amplifier unit 131. Further, the control circuit 105 has a function of analyzing the power which is detected by the power detection unit 132. Furthermore, the control circuit 105 has a function of controlling the power adjustment value of the power adjustment unit 133. The first terminal of the control circuit 105 is electrically connected to the third terminal of the modulation circuit 141. The second terminal of the control circuit 105 is electrically connected to the third terminal of the power amplifier unit 131. The third terminal of the control circuit 105 is electrically connected to the first terminal of the demodulation circuit 142. The fourth terminal of the control circuit 105 is electrically connected to the third terminal of the power detection unit 132. The fifth terminal of the control circuit 105 is electrically connected to the third terminal of the power adjustment unit 133.

The antenna 151 includes the electromagnetic coupling coil 106, the resonant coil 108, and the capacitor 109. In this embodiment, the AC power generated in the AC power source 107 is transmitted from the electromagnetic coupling coil 106 to the resonant coil 108 by electromagnetic coupling. The AC power is transmitted from the resonant coil 108 of the power transmission device 100 to a resonant coil 112 of the power receiving device 110, which is described later, by resonance (LC resonance) of the resonant coil 108 of the power transmission device 100 with the resonant coil 112 of the power receiving device 110 at the same frequency. In addition, the AC power which is received by the resonant coil 112 of the power receiving device 110 is transmitted from the resonant coil 112 of the power receiving device 110 to an electromagnetic coupling coil 113 which is described later by electromagnetic coupling.

Note that in the case where transmission of the AC power between the power transmission device 100 and the power receiving device 110 is performed using not a resonance phenomenon but electromagnetic coupling, the resonant coil 108 and the capacitor 109 of the power transmission device 100 and the resonant coil 112 and the capacitor 111 of the power receiving device 110 are not necessarily provided. In the case where the transmission of the AC power between the power transmission device 100 and the power receiving device 110 is performed using electromagnetic coupling, the transmission may be performed using electromagnetic coupling between the electromagnetic coupling coil 106 of the power transmission device 100 and the electromagnetic coupling coil 113 of the power receiving device 110.

The first terminal of the electromagnetic coupling coil 106 is electrically connected to the third terminal of the directional coupler 103. A second terminal of the electromagnetic coupling coil 106 is grounded.

One terminal and the other terminal of the resonant coil 108 are electrically connected to one terminal and the other terminal of the capacitor 109, respectively.

Although the power transmission device 100 which includes the power detection unit 132, the switch 134, and the load 135 is described in FIG. 2, in the case where the reflected power has a known value and a power which is input to the demodulation circuit 142 has a value within the input voltage region where the demodulation circuit 142 can stably perform communication processing, the power detection unit 132, the switch 134, and the load 135 are not necessarily provided. A power transmission device 102 which does not include the power detection unit 132, the switch 134, and the load 135 is illustrated in FIG. 9.

Figure 9:
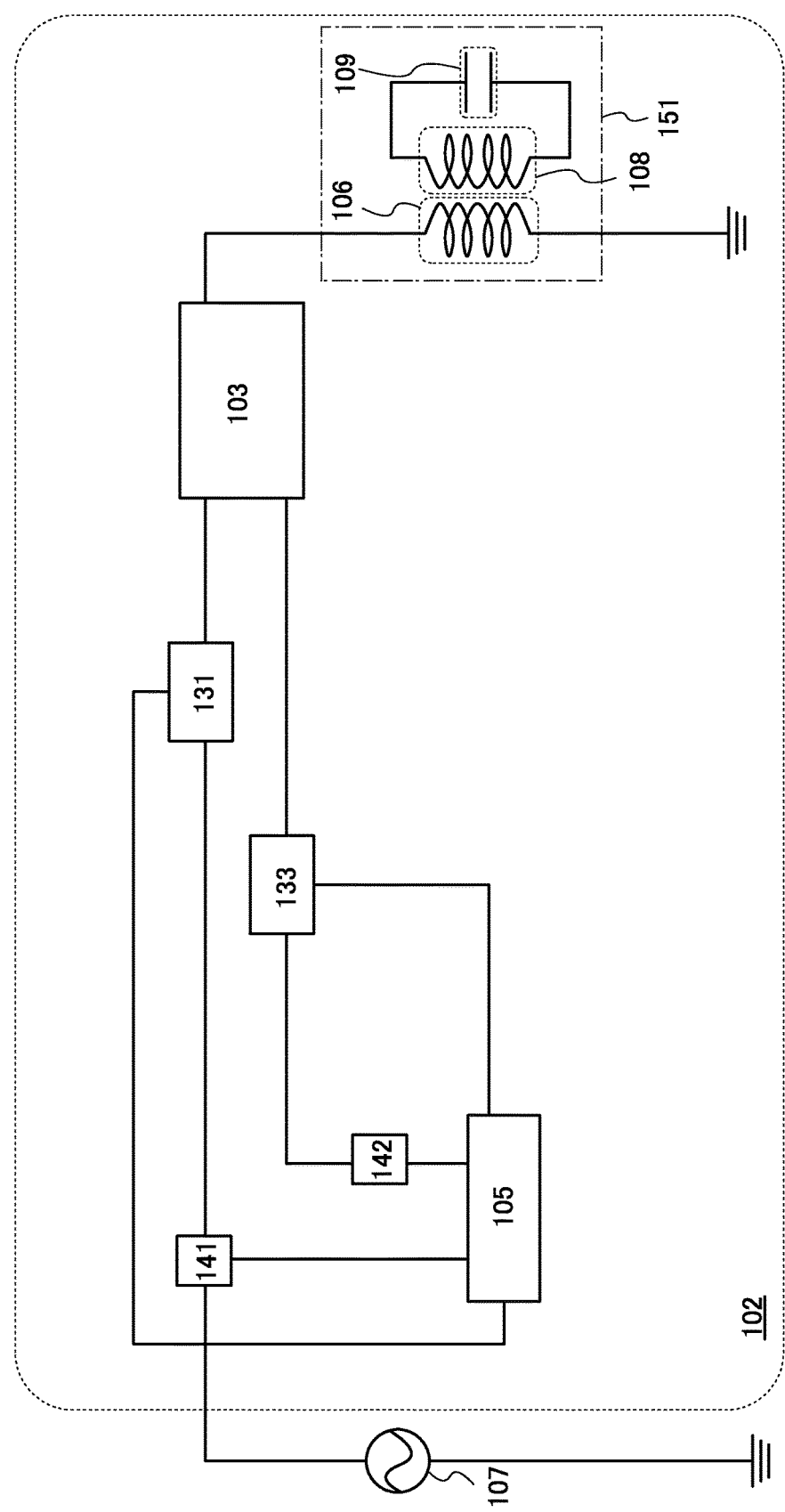
FIG. 9 is a circuit diagram of a power transmission device.

In the power transmission device 102 illustrated in FIG. 9, the reflected power has a known value, and thus a power detection unit which detects the value of the reflected power is not provided. In addition, since a power which is input to the demodulation circuit 142 has a value within the input voltage region where the demodulation circuit 142 can stably perform communication processing, a load is unnecessary. Since a load is unnecessary, a switch is also unnecessary.

<Specific Structure of Power Receiving Device>

Figure 3:
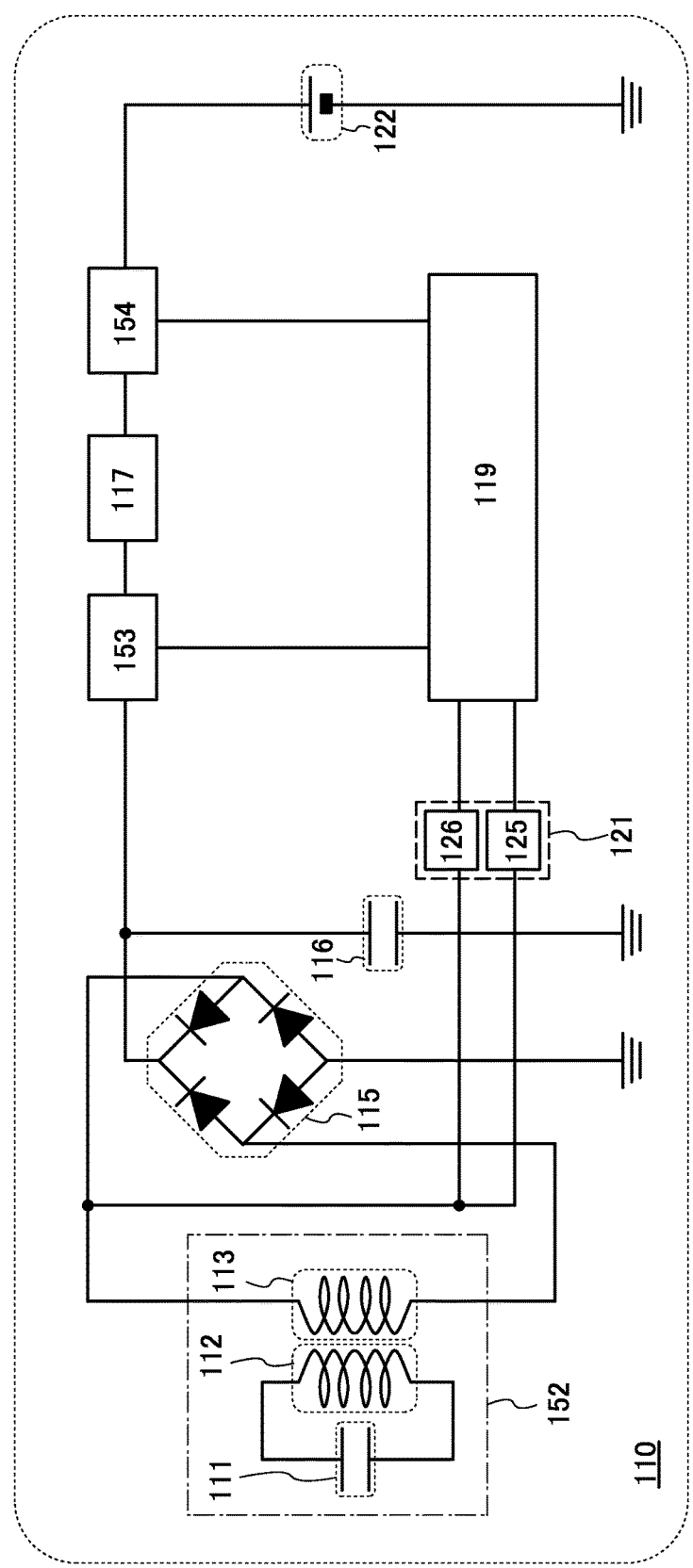
FIG. 3 is a circuit diagram of a power receiving device.

FIG. 3 illustrates a specific structure of the power receiving device 110. The power receiving device 110 illustrated in FIG. 3 includes the antenna 152, the rectifier circuit 115, a smoothing circuit 116, the power detection unit 153, the voltage adjustment unit 117, the power detection unit 154, the power storage device 122, the communication control unit 121 including the modulation circuit 125 and the demodulation circuit 126, and the control circuit 119. The antenna 152 includes a capacitor 111, the resonant coil 112, and the electromagnetic coupling coil 113.

As described above, in this embodiment, power is transmitted from the resonant coil 108 of the power transmission device 100 to the resonant coil 112 of the power receiving device 110 using a resonance phenomenon. An AC power which is received by the resonant coil 112 is transmitted from the resonant coil 112 to the electromagnetic coupling coil 113 by electromagnetic coupling. In the case where the AC power is transmitted between the power transmission device 100 and the power receiving device 110 by using not a resonance phenomenon but electromagnetic coupling, the capacitor 111 and the resonant coil 112 are not necessarily provided.

One terminal and the other terminal of the resonant coil 112 are electrically connected to one terminal and the other terminal of the capacitor 111, respectively.

A first terminal of the electromagnetic coupling coil 113 is electrically connected to a first terminal of the rectifier circuit 115, a first terminal of the modulation circuit 125, and a first terminal of the demodulation circuit 126. A second terminal of the electromagnetic coupling coil 113 is electrically connected to a second terminal of the rectifier circuit 115.

The rectifier circuit 115 functions as an AC-DC converter which converts AC power into DC power. The rectifier circuit 115 illustrated in FIG. 3 is a bridge rectifier including four diodes. The first terminal of the rectifier circuit 115 is electrically connected to the first terminal of the electromagnetic coupling coil 113. The second terminal of the rectifier circuit 115 is electrically connected to the second terminal of the electromagnetic coupling coil 113. A third terminal of the rectifier circuit 115 is electrically connected to a first terminal of the smoothing circuit 116 and a first terminal of the power detection unit 153. A fourth terminal of the rectifier circuit 115 is grounded.

The smoothing circuit 116 has a function of smoothing DC power output from the rectifier circuit 115 by storing and releasing the DC power. In this embodiment, a capacitor is used as the smoothing circuit 116. The first terminal of the smoothing circuit 116 is electrically connected to the third terminal of the rectifier circuit 115 and the first terminal of the power detection unit 153. A second terminal of the smoothing circuit 116 is grounded.

The power detection unit 153 has a function of detecting the value of the DC power which is rectified by the rectifier circuit 115 and smoothed by the smoothing circuit 116. The first terminal of the power detection unit 153 is electrically connected to the first terminal of the smoothing circuit 116 and the third terminal of the rectifier circuit 115. A second terminal of the power detection unit 153 is electrically connected to a first terminal of the voltage adjustment unit 117. A third terminal of the power detection unit 153 is electrically connected to a first terminal of the control circuit 119.

The voltage adjustment unit 117 includes a voltage converter circuit which converts the value of a DC voltage into a different voltage value. The first terminal of the voltage adjustment unit 117 is electrically connected to the second terminal of the power detection unit 153. A second terminal of the voltage adjustment unit 117 is electrically connected to a first terminal of the power detection unit 154.

The power detection unit 154 is a circuit which detects the value of a power with which the power storage device 122 is charged. Specifically, the power detection unit 154 has a function of detecting the value of a voltage which is applied to the power detection unit 154 and a function of detecting the value of a current which flows in the power detection unit 154. The first terminal of the power detection unit 154 is electrically connected to the second terminal of the voltage adjustment unit 117. A second terminal of the power detection unit 154 is electrically connected to a positive electrode of the power storage device 122. A third terminal of the power detection unit 154 is electrically connected to a second terminal of the control circuit 119.

The power storage device 122 has a function of storing a DC power. The positive electrode of the power storage device 122 is electrically connected to the second terminal of the power detection unit 154. A negative electrode of the power storage device 122 is grounded.

The modulation circuit 125 of the communication control unit 121 has a function of modulating the response signal which is generated in the control circuit 119. The modulation of the response signal by the modulation circuit 125 makes it possible to transmit the response signal from the power receiving device 110 to the power transmission device 100. As described above, the transmission signal has the information of the power receiving device 110. In this embodiment, the response signal is an electromagnetic wave which is amplitude-modulated, as described above. The first terminal of the modulation circuit 125 is electrically connected to the first terminal of the electromagnetic coupling coil 113, the first terminal of the rectifier circuit 115, and the first terminal of the demodulation circuit 126. A second terminal of the modulation circuit 125 is electrically connected to a third terminal of the control circuit 119.

The demodulation circuit 126 of the communication control unit 121 has a function of converting the transmission signal, which is included in the AC power transmitted from the power transmission device 100 and received by the power receiving device 110, into a signal which can be processed by the control circuit 119 at the time when the transmission signal is input to the control circuit 119. The first terminal of the demodulation circuit 126 is electrically connected to the first terminal of the electromagnetic coupling coil 113, the first terminal of the rectifier circuit 115, and the first terminal of the modulation circuit 125.

The control circuit 119 has a function of processing the transmission signal which is transmitted from the power transmission device 100, a function of generating the response signal having the information of the power receiving device 110, a function of controlling the power detection unit 153, and a function of controlling the power detection unit 154. The first terminal of the control circuit 119 is electrically connected to the third terminal of the power detection unit 153. The second terminal of the control circuit 119 is electrically connected to the third terminal of the power detection unit 154. The third terminal of the control circuit 119 is electrically connected to the second terminal of the modulation circuit 125. A fourth terminal of the control circuit 119 is electrically connected to the second terminal of the demodulation circuit 126.

<Operation of Power Feeding System>

Figure 4:
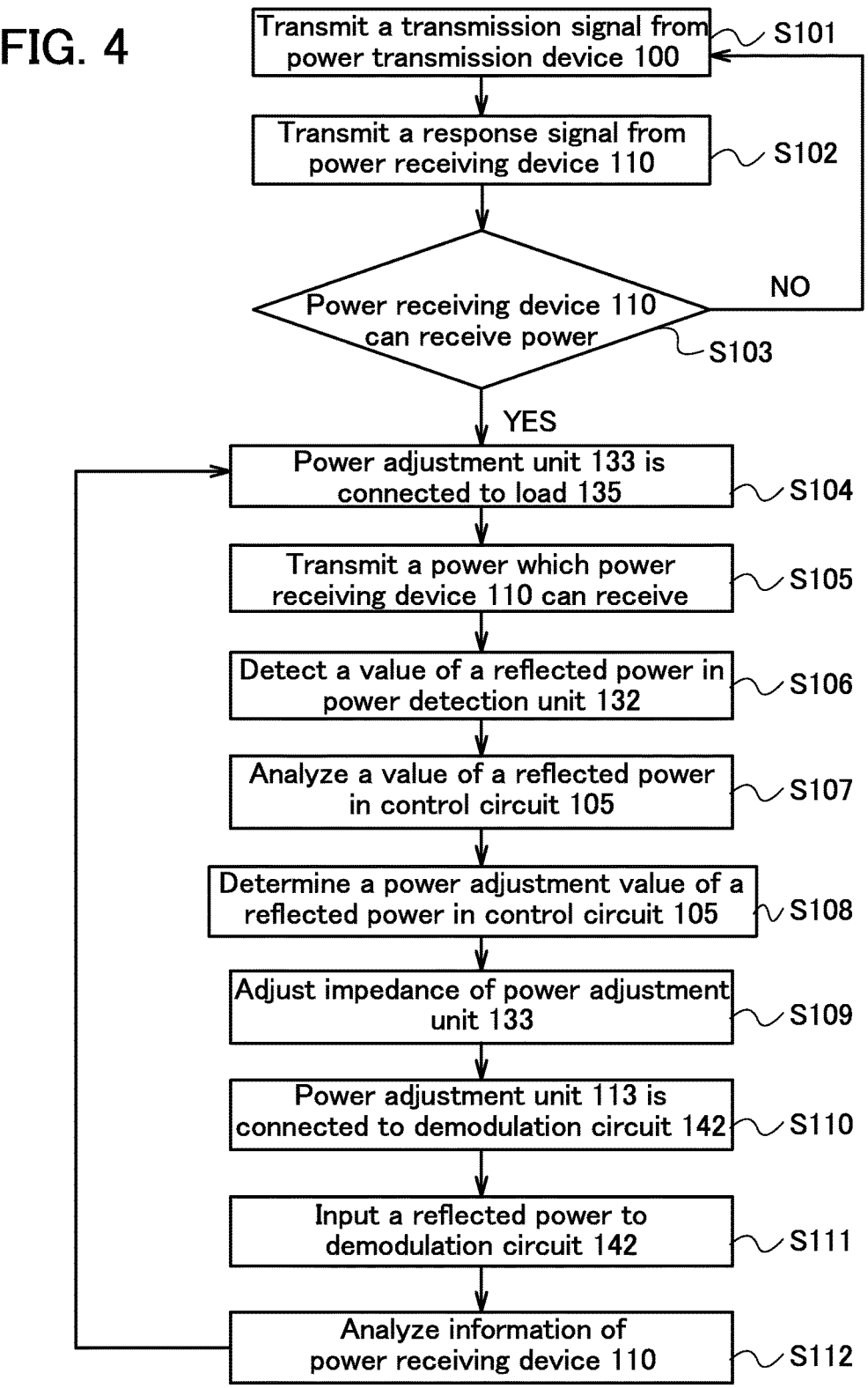
FIG. 4 is a flowchart showing operation of a power feeding system.

FIG. 4 is a flowchart of operation of the power feeding system of this embodiment.

As a first step, a transmission signal which has an instruction to send the information of the power receiving device 110 to the power transmission device 100 is transmitted from the power transmission device 100 to the power receiving device 110 (Step S101).

Next, in response to the transmission signal, a response signal having the information of the power receiving device 110 is transmitted from the power receiving device 110 to the power transmission device 100 (Step S102). The response signal has the ID of the power receiving device 110 and information which indicates whether or not a foreign substance exists between the power receiving device 110 and the power transmission device 100, for example.

In the case where the power receiving device 110 can receive power (Step S103), the second terminal and the third terminal of the switch 134 are connected to each other, so that the second terminal of the power adjustment unit 133 and the first terminal of the load 135 are electrically connected to each other (Step S104).

In the case where the power receiving device 110 cannot receive power (Step S103), the transmission signal which has an instruction to send the response signal having the information of the power receiving device 110 is transmitted again from the power transmission device 100 (Step S101).

In the case where the second terminal of the power adjustment unit 133 and the first terminal of the load 135 are electrically connected to each other (Step S104), a power which the power receiving device 110 can receive is transmitted from the power transmission device 100 to the power receiving device 110 (Step S105). Note that the power includes a transmission signal for communication. The value of the power which the power receiving device 110 can receive is larger than the value of the power of the transmission signal which is sent from the power transmission device 100 to the power receiving device 110 in Step S102.

In response to the modulation signal (transmission signal) and the power which has been transmitted from the power transmission device 100 and received by the power receiving device 110, a reflected power is transmitted from the power receiving device 110 to the power transmission device 100. The reflected power has information of the power receiving device 110. The power detection unit 132 detects the value of the reflected power (Step S106). Information (a signal) of the value of the reflected power detected by the power detection unit 132 is sent to the control circuit 105 and analyzed by the control circuit 105 (Step S107). The control circuit 105 calculates an optimal power adjustment value for the value of the analyzed reflected power so that the reflected power has a value within the input voltage region where the demodulation circuit 142 can stably perform communication processing, and the control circuit 105 determines the power adjustment value (Step S108).

Based on the optimal power adjustment value determined by the control circuit 105, impedance of the power adjustment unit 133 is adjusted so that the reflected power which is input to the demodulation circuit 142 has a value within the input voltage region where the demodulation circuit 142 can stably perform communication processing (Step S109). To adjust the impedance of the power adjustment unit 133, an optimal power adjustment element is selected from the power adjustment elements illustrated in FIGS. 6A to 6C. As described above, the plurality of the power adjustment elements included in the power adjustment unit 133 are connected in parallel, in series, or in combination thereof. In addition, the plurality of switches which operate on the basis of the signal 51 output from the control circuit 105 is provided. By switching the plurality of switches on the basis of the signal 51 output from the control circuit 105, an optimal power adjustment element is selected so that the optimal power adjustment value is obtained. In the above manner, the impedance of the power adjustment unit 133 can be adjusted.

Next, the second terminal and the first terminal of the switch 134 are connected to each other, so that the second terminal of the power adjustment unit 133 and the second terminal of the demodulation circuit 142 are electrically connected to each other (Step S110).

The reflected power has a value within the input voltage region where the demodulation circuit 142 can stably perform communication processing, as a result of passing through the power adjustment unit 133 whose impedance has been adjusted, and is input to the demodulation circuit 142. Accordingly, the information of the power receiving device 110 included in the reflected power is input to the demodulation circuit 142 (Step S111).

The information of the power receiving device 110 which is input to the demodulation circuit 142 is analyzed by the control circuit 105 (Step S112).

When power feeding is advanced, a resistance value of the power storage device 122 of the power receiving device 110 is increased, so that the value of the reflected power from the power receiving device 110 to the power transmission device 100 is changed. In the case where the value of the reflected power which has been subjected to the adjustment by the power adjustment unit 133 (the value of an input power to the demodulation circuit 142) is out of the input voltage region where the demodulation circuit 142 can stably perform communication processing, the process returns to Step S104, and the second terminal of the power adjustment unit 133 and the first terminal of the load 135 are electrically connected to each other. Further, Steps S105 to S108 are carried out to determine a new power adjustment value of the reflected power. As described above, until power feeding is completed, the impedance of the power adjustment unit 133 is adjusted in accordance with the flowchart in FIG. 4 so that the value of the reflected power subjected to the adjustment (the value of the input power to the demodulation circuit 142) is within the input voltage region where the demodulation circuit 142 can perform communication processing. Accordingly, even when power feeding is advanced and the reflected power is changed, a power feeding system which can stably perform communication between the power transmission device and the power receiving device can be obtained.

Figure 5:
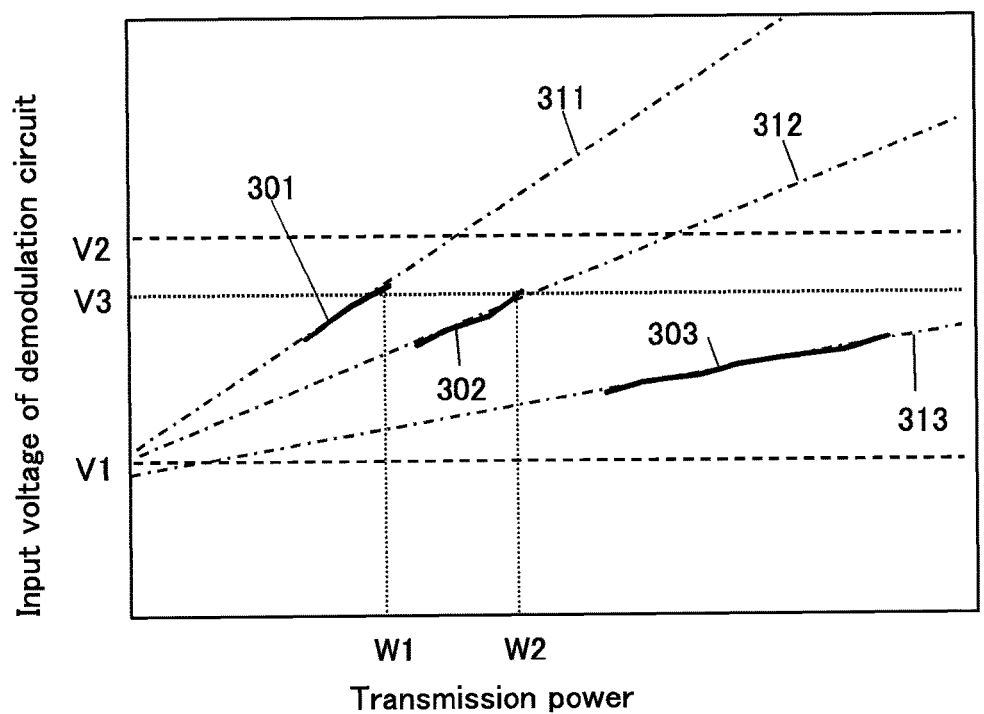
FIG. 5 shows a relation between a transmission power and an input power of a demodulation circuit.

FIG. 5 shows a relation between the transmission power (power transmitted from the power transmission device 100 to the power receiving device 110) and the input power to the demodulation circuit at the time when the value of the input power to the demodulation circuit 142 is kept within the input voltage region where the demodulation circuit 142 can stably perform communication processing in accordance with the flowchart shown in FIG. 4.

In FIG. 5, the input voltage region where the demodulation circuit 142 can stably perform communication processing is higher than or equal to the voltage V1 and lower than or equal to the voltage V2. In FIG. 5, after the start of power feeding, first, Steps S101 to S111 are carried out, so that the power adjustment value of the reflected power is kept at a first power adjustment value A1. The impedance of the power adjustment unit 133 at this time is referred to as first impedance Z1. Change of the voltage which is input to the demodulation circuit 142 with respect to change of the transmission power in the case where the impedance of the power adjustment unit 133 is the first impedance Z1 is denoted by a curve 301. In addition, an approximate line of the curve 301 is denoted by a line 311.

The line 311 shows that if the transmission power continues to increase, the voltage input to the demodulation circuit 142 exceeds the voltage V2. Thus, before the voltage input to the demodulation circuit 142 exceeds the voltage V2, the power adjustment value of the reflection power is adjusted. For example, when the transmission power is gradually raised during power feeding to reaches W1, the process returns from the Step S111 to Step S104, and a new power adjustment value of the reflected power is determined (Step S108). Note that a voltage V3 which is input to the demodulation circuit 142 when the transmission power is W1 is a voltage which does not exceed the voltage V2. The new power adjustment value of the reflected power is referred to as a second power adjustment value A2, and impedance of the power adjustment unit 133 with which the second power adjustment value A2 is obtained is referred to as second impedance Z2. The impedance of the power adjustment unit 133 is changed from the first impedance Z1 to the second impedance Z2 (Step S109), and the reflected power which has the second power adjustment value A2 is input to the demodulation circuit 142 (Step S110). Change of the voltage which is input to the demodulation circuit 142 with respect to change of the transmission power in the case where the impedance of the power adjustment unit 133 is the second impedance Z2 is denoted by a curve 302, In addition, an approximate line of the curve 302 is denoted by a line 312.

When the transmission power is further increased from the power W1 during power feeding to reach the power W2, operation similar to that described above is performed, whereby a third power adjustment value A3 is determined and the impedance of the power adjustment unit 133 is changed to a third impedance Z3. Change of the voltage which is input to the demodulation circuit 142 with respect to change of the transmission power in the case where the impedance of the power adjustment unit 133 is the third impedance Z3 is denoted by a curve 303. In addition, an approximate line of the curve 303 is denoted by a line 313.

As described above, even when the transmission power and the reflected power in accordance with the transmission power are changed, the voltage value of the power which is input to the demodulation circuit 142 can be kept within the input voltage region where the demodulation circuit 142 can stably perform communication processing.

Note that in the case where power feeding is performed using the power transmission device 102 illustrated in FIG. 9, Steps S104 to S109 are not performed; when the power receiving device 110 can receive power (Step S103), a different power adjustment element of the power adjustment unit 133 is selected and the impedance of the power adjustment unit 133 is adjusted (Step S109), and then the reflected power is input to the demodulation circuit 142 (Step S111).

According to this embodiment, it is possible to provide a power transmission device which is capable of stable communication at the same time as power feeding.

Further, according to this embodiment, it is possible to provide a power feeding system which includes the power transmission device which is capable of stable communication at the same time as power feeding.

(Embodiment 2)

In this embodiment, electric appliances to which the power feeding system in Embodiment 1 is applicable are described. Note that examples of electric appliances to which a power feeding system according to one embodiment of the present invention include portable electronic devices such as digital video cameras, portable information terminals (e.g., mobile computers, cellular phones, portable game consoles, and e-book readers), and image reproducing devices including a recording medium (specifically digital versatile disc (DVD) reproducing devices). In addition, the examples also include an electric propulsion moving vehicle that is powered by electric power, such as an electric car. Examples of such electronic appliances are described below with reference to FIGS. 7A and 7B.

Figure 7A:
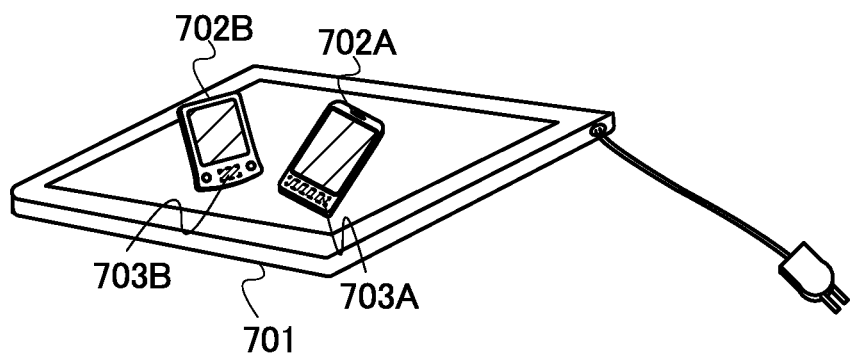
FIGS. 7A and 7B each illustrate an electric appliance to which a power feeding system is applicable.

FIG. 7A illustrates an application of a power feeding system to a cellular phone and a portable information terminal in which a power transmission device 701, a cellular phone 702A including a power receiving device 703A, and a cellular phone 702B including a power receiving device 703B are included. The power feeding system in Embodiment 1 can be provided for the power transmission device 701 and the power receiving devices 703A and 703B.

Figure 7B:
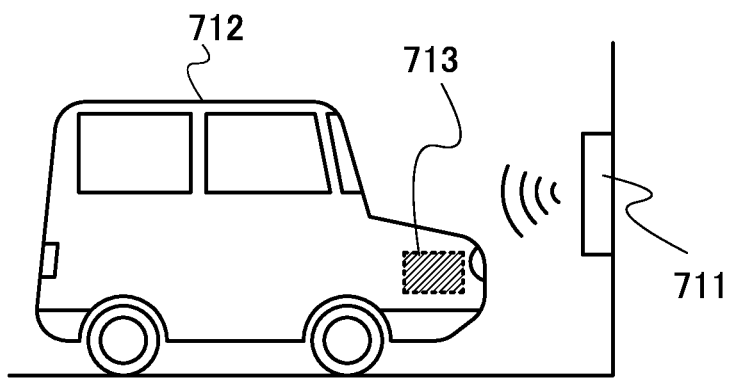

FIG. 7B illustrates an application of a power supply system to an electric car that is an electric propulsion moving vehicle in which a power transmission device 711 and an electric car 712 including a power receiving device 713 are included. The power feeding system in Embodiment 1 can be provided for the power transmission device 711 and the power receiving device 713.

According to this embodiment, it is possible to provide a power transmission device which is capable of stable communication at the same time as power feeding.

Further, according to this embodiment, it is possible to a power feeding system which includes the power transmission device which is capable of stable communication at the same time as power feeding.

According to this embodiment, stable power feeding and communication to an electric appliance can be achieved.

This application is based on Japanese Patent Application serial no. 2012-057763 filed with Japan Patent Office on Mar. 14, 2012, the entire contents of which are hereby incorporated by reference.

What is claimed is:

1. A power transmission device comprising:
an antenna;
a directional coupler;
a power amplifier unit;
a power adjustment unit;
a control circuit;
a modulation circuit; and
a demodulation circuit, wherein:
the antenna is configured to receive a reflected power from a power receiving device,
the directional coupler is electrically connected to the antenna and the power amplifier unit,
the power amplifier unit is electrically connected to an AC power and is configured to amplify a value of the AC power,
the power adjustment unit is electrically connected to the directional coupler and is configured to lower the reflected power,
the control circuit is electrically connected to the power adjustment unit, the modulation circuit, the demodulation circuit, and the power amplifier unit, and configured to generate a transmission signal to be transmitted to the power receiving device, process a response signal included in the reflected power from the power receiving device,
the modulation circuit is electrically connected to the power amplifier unit and configured to convert the transmission signal into a signal with which wireless communication is possible,
the demodulation circuit is electrically connected to the power adjustment unit and configured to converting the response signal into a signal that is processed by the control circuit.

2. The power transmission device according to claim 1, wherein the power adjustment unit comprises:
a first power adjustment element comprising a plurality of capacitors;
a second power adjustment element comprising a plurality of resistors;
a first switch electrically connected to the first power adjustment element and the second power adjustment element; and
a second switch electrically connected to the first power adjustment element and the second power adjustment element, and wherein the first switch and the second switch are configured to collectively select an electrical path thorough either the first power adjustment element or the second power adjustment element.

3. The power transmission device according to claim 2, wherein the first power adjustment element comprises:
a first capacitor comprising:
a first terminal electrically connected to the first switch; and
a second terminal electrically connected to the second switch; and
a second capacitor comprising a terminal electrically connected to the second terminal of the first capacitor and the second switch.

4. The power transmission device according to claim 2, wherein the second power adjustment element comprises:
a first resistor comprising:
a first terminal electrically connected to the first switch; and
a second terminal electrically connected to the second switch;
a second resistor comprising a terminal electrically connected to the first switch and the first terminal of the first resistor; and
a third resistor comprising a terminal electrically connected to the second switch and the second terminal of the first resistor.

5. A power transmission device comprising:
an antenna;
a directional coupler;
a power amplifier unit;
a power detection unit;
a power adjustment unit;
a control circuit;
a modulation circuit; and
a demodulation circuit,
wherein:
the antenna is configured to receive a reflected power from a power receiving device,
the directional coupler is electrically connected to the antenna and the power detection unit,
the power amplifier unit is electrically connected to an AC power and is configured to amplify a value of the AC power,
the power detection unit is configured to detect a value of the reflected power,
the power adjustment unit is electrically connected to the power detection unit and is configured to lower the reflected power in accordance with control by the control circuit on the basis of the value of the reflected power detected in the power detection unit,
the control circuit is electrically connected to the power detection unit, the power adjustment unit, the modulation circuit, the demodulation circuit, and the power amplifier unit and configured to generate a transmission signal to be transmitted to the power receiving device, process a response signal included in the reflected power from the power receiving device,
the modulation circuit is electrically connected to the power amplifier unit and configured to convert the transmission signal into a signal with which wireless communication is possible,
the demodulation circuit is electrically connected to the power adjustment unit and configured to converting the response signal into a signal that is processed by the control circuit.

6. The power transmission device according to claim 5, wherein the power adjustment unit comprises:
a first power adjustment element comprising a plurality of capacitors;
a second power adjustment element comprising a plurality of resistors;
a first switch electrically connected to the first power adjustment element and the second power adjustment element; and
a second switch electrically connected to the first power adjustment element and the second power adjustment element, and
wherein the first switch and the second switch are configured to collectively select an electrical path through either the first power adjustment element or the second power adjustment element.

7. The power transmission device according to claim 6, wherein the first power adjustment element comprises:
a first capacitor comprising:
a first terminal electrically connected to the first switch; and
a second terminal electrically connected to the second switch; and
a second capacitor comprising a terminal electrically connected to the second terminal of the first capacitor and the second switch.

8. The power transmission device according to claim 6, wherein the second power adjustment element comprises:
a first resistor comprising:
a first terminal electrically connected to the first switch; and
a second terminal electrically connected to the second switch;
a second resistor comprising a terminal electrically connected to the first switch and the first terminal of the first resistor; and
a third resistor comprising a terminal electrically connected to the second switch and the second terminal of the first resistor.

9. The power transmission device according to claim 5, further comprising:
a switch; and
a load electrically connected to the power adjustment unit through the switch,
wherein the demodulation circuit is electrically connected to the power adjustment unit through the switch.

10. A power feeding system comprising:
a power receiving device comprising:
a second antenna;
a rectifier circuit electrically connected to the second antenna;
a second power detection unit electrically connected to the rectifier circuit;
a voltage adjustment unit electrically connected to the second power detection unit; and
a power storage device electrically connected to the voltage adjustment unit; and
a power transmission device comprising:
a first antenna;
a directional coupler;
a power amplifier unit;
a first power detection unit;
a power adjustment unit;
a control circuit;
a modulation circuit; and
a demodulation circuit, wherein:
the first antenna is configured to receive a reflected power from the power receiving device,
the directional coupler is electrically connected to the first antenna and the first power detection unit,
the power amplifier unit is electrically connected to an AC power and is configured to amplify a value of the AC power,
the first power detection unit is configured to detect a value of the reflected power,
the power adjustment unit is electrically connected to the first power detection unit and is configured to lower the reflected power in accordance with control by the control circuit on the basis of the value of the reflected power detected in the first power detection unit,
the control circuit is electrically connected to the first power detection unit, the power adjustment unit, the modulation circuit, the demodulation circuit, and the power amplifier unit, and configured to generate a transmission signal to be transmitted to the power receiving device, process a response signal included in the reflected power from the power receiving device,
the modulation circuit is electrically connected to the power amplifier unit and configured to convert the transmission signal into a signal with which wireless communication is possible,
the demodulation circuit is electrically connected to the power adjustment unit and configured to converting the response signal into a signal that is processed by the control circuit.

11. The power feeding system according to claim 10, wherein the power adjustment unit comprises:
a first power adjustment element comprising a plurality of capacitors;
a second power adjustment element comprising a plurality of resistors;
a first switch electrically connected to the first power adjustment element and the second power adjustment element; and
a second switch electrically connected to the first power adjustment element and the second power adjustment element, and
wherein the first switch and the second switch are configured to collectively select an electrical path through either the first power adjustment element or the second power adjustment element.

12. The power feeding system according to claim 11, wherein the first power adjustment element comprises:
a first capacitor comprising:
a first terminal electrically connected to the first switch; and
a second terminal electrically connected to the second switch; and
a second capacitor comprising a terminal electrically connected to the second terminal of the first capacitor and the second switch.

13. The power feeding system according to claim 11, wherein the second power adjustment element comprises:
a first resistor comprising:
a first terminal electrically connected to the first switch; and
a second terminal electrically connected to the second switch;
a second resistor comprising a terminal electrically connected to the first switch and the first terminal of the first resistor; and
a third resistor comprising a terminal electrically connected to the second switch and the second terminal of the first resistor.

14. The power feeding system according to claim 10, further comprising:
a switch; and
a load electrically connected to the power adjustment unit through the switch,
wherein the demodulation circuit is electrically connected to the power adjustment unit through the switch.

* * * * *